US012340337B2

(12) United States Patent
Devnani et al.

(10) Patent No.: US 12,340,337 B2
(45) Date of Patent: Jun. 24, 2025

(54) ROUTE PLANNING FOR MATERIAL SHIPPING

(71) Applicant: Accenture Global Solutions Limited, Dublin (IE)

(72) Inventors: Ghanshyam Devnani, Bengaluru (IN); Loganantha Naidu Esparan, Petaling Jaya (MY); Kumud Ranjan Jha, Bedok (SG); Vivek Luthra, Melbourne (AU); Monto Paul Rodrigues, Mumbai (IN); Sandra Orozco Martín, Barcelona (ES); Aikansh Jain, Delhi (IN); Roman Buil Giné, Barcelona (ES); Henrique Vázquez Muiños, Barcelona (ES); Quim Arnau, Barcelona (ES); Marc Blanchart Forne, Barcelona (ES); Diinalan Gunasagaram, Subang Jaya (MY); Rodrigo Baranda Castrillo, Madrid (ES)

(73) Assignee: Accenture Global Solutions Limited, Dublin (IE)

( * ) Notice: Subject to any disclaimer, the term of this patent is extended or adjusted under 35 U.S.C. 154(b) by 183 days.

(21) Appl. No.: 18/113,783

(22) Filed: Feb. 24, 2023

(65) Prior Publication Data

US 2023/0274217 A1    Aug. 31, 2023

Related U.S. Application Data

(60) Provisional application No. 63/313,817, filed on Feb. 25, 2022.

(51) Int. Cl.
*G06Q 10/083* (2024.01)
*G01W 1/02* (2006.01)
(Continued)

(52) U.S. Cl.
CPC ............ *G06Q 10/083* (2013.01); *G01W 1/02* (2013.01); *G06N 3/126* (2013.01); *G06Q 10/04* (2013.01); *G06Q 10/06315* (2013.01)

(58) Field of Classification Search
CPC ....... G06Q 10/04; G06Q 10/047; B63B 79/40
See application file for complete search history.

(56) References Cited

U.S. PATENT DOCUMENTS 7,949,465 B2 * 5/2011 Bruce .................. G01C 21/005
                                                   701/415
10,803,213 B2   10/2020 Bhattacharyya et al.
(Continued)

OTHER PUBLICATIONS

Seshadri, Anand; "Vehicle Routing Problems 101"; Published Mar. 8, 2019; Medium.com; pp. 1-12; https://medium.com/opex-analytics/opex-101-vehicle-routing-problems-262a173f4214 (Year: 2019).*
(Continued)

*Primary Examiner* — Resha Desai
*Assistant Examiner* — Michael C Moroney
(74) *Attorney, Agent, or Firm* — Polsinelli PC

(57) ABSTRACT

Implementations include receiving demand data representing types of material and quantities of material demanded for each of a plurality of locations within a geographical area; receiving vessel data representing availabilities and capacities of each of a plurality of vessels; processing the demand data and the vessel data through a capacity optimization model to provide a first output comprising initial voyage plans for the plurality of vessels; receiving weather data representing predicted weather conditions within the geographical area; and processing the first output and the weather data through a sequence optimization model to provide a second output comprising updated voyage plans. Each initial voyage plan and each updated voyage plan defines a type of material, quantity of material, vessel, and sequence of locations. Implementations include transmitting
(Continued)

instructions that cause an adjustment of one or more settings of respective maneuvering systems of the vessels to voyage under the updated voyage plans.

18 Claims, 12 Drawing Sheets

(51) Int. Cl.
  *G06N 3/126* (2023.01)
  *G06Q 10/04* (2023.01)
  *G06Q 10/0631* (2023.01)

(56) References Cited

U.S. PATENT DOCUMENTS

| | | | |
|---|---|---|---|
| 11,119,250 B2* | 9/2021 | O'Donncha | G01W 1/00 |
| 11,466,998 B1* | 10/2022 | Williams | G06Q 10/0635 |
| 2006/0235739 A1* | 10/2006 | Levis | G06Q 10/08 |
| | | | 705/1.1 |
| 2008/0120148 A1* | 5/2008 | Narayanan | G06N 5/01 |
| | | | 705/7.11 |
| 2016/0358087 A1* | 12/2016 | Frieder | G06N 5/01 |
| 2017/0262790 A1* | 9/2017 | Khasis | G01C 21/3415 |
| 2019/0197475 A1* | 6/2019 | Bianconcini | G05D 1/0287 |
| 2019/0251509 A1 | 8/2019 | Simpson | |
| 2019/0303859 A1* | 10/2019 | Dulebenets | G06Q 10/1091 |
| 2021/0027225 A1* | 1/2021 | Mikalsen | B63B 79/40 |
| 2021/0262811 A1* | 8/2021 | Zellner | G01C 21/3492 |
| 2021/0356279 A1 | 11/2021 | Szigeti | |
| 2021/0371065 A1* | 12/2021 | Dokken | G01C 21/203 |
| 2022/0036310 A1* | 2/2022 | Heinla | G06Q 10/08 |
| 2023/0106268 A1* | 4/2023 | Venkatesh | H04L 63/102 |
| | | | 701/23 |

OTHER PUBLICATIONS

"Custom Data Type Optimization Using the Genetic Algorithm"; Accessed as of May 8, 2021; MathWorks; pp. 1-9; https://www.mathworks.com/help/gads/custom-data-type-optimization-using-ga.html (Year: 2021).*

NEO.LCC.UMA.es [online], "Savings Algorithm," Jan. 7, 2013, retrieved on Aug. 2, 2023, retrieved from URL<https://neo.lcc.uma.es/vrp/solution-methods/heuristics/savings-algorithms/>, 1 page.

* cited by examiner

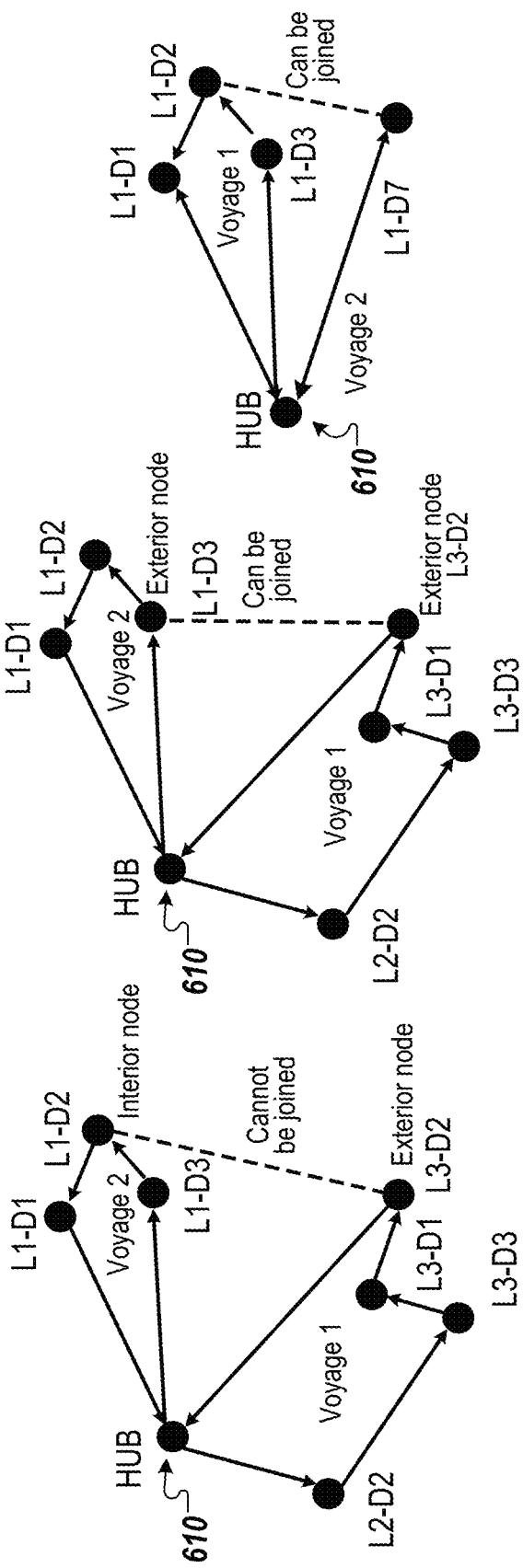

ROUTE PLANNING FOR MATERIAL SHIPPING

CROSS-REFERENCE TO RELATED APPLICATIONS

This application claims priority to U.S. App. No. 63/313,817 filed on Feb. 25, 2022, the disclosure of which is expressly incorporated herein by reference in the entirety.

FIELD

This specification relates to systems for improving efficiency in transporting people and/or materials.

BACKGROUND

Transportation logistics involve a highly complex nature of operations and numerous operational constraints. Logistical planning is impacted by dynamically changing needs of enterprises that are supported by resource providers. This complexity results in inefficient operation of transportation vehicles, which results in undesirable expenditure of resources, such as energy (e.g., fuel, electricity). It is desirable to efficiently manage fuel consumption of transportation vehicles while also ensuring that shipping schedules meet user requirements of cost and service levels and balanced capacity requirements.

SUMMARY

Implementations of the present disclosure are directed to improving efficiency in transporting material and/or personnel. More particularly, implementations of the present disclosure are directed to a logistical planning platform that optimizes voyage plans for delivering material to locations within a geographic region. The disclosed techniques can be used to generate and refine voyage plans, based on dynamic resource demand and transportation availability, for improved efficiency in shipping and reduced resource consumption (e.g., fuel, electricity).

The present disclosure provides a system and method to plan efficient shipping routes of transportation vehicles in order to accommodate material demand. A transport vehicle can be, for example, a marine vessel, an aircraft, a truck, a train, or another type of vehicle that can be used to move material and personnel from one place to another.

The disclosed implementations can be used improve schedule reliability, transportation vessel idling time, fleet shipping capacity, and fuel consumption. Thus, implementations may reduce environmental impacts of transport vessels, such as reduced resource consumption, while improving operational efficiency and reducing costs of operating the transport vehicles.

In some implementations, actions include receiving demand data representing types of material and quantities of material demanded for each of a plurality of locations within a geographical area; receiving vessel data representing availabilities and capacities of each of a plurality of vessels; processing the demand data and the vessel data through a capacity optimization model to provide a first output comprising initial voyage plans for the plurality of vessels; receiving weather data representing predicted weather conditions within the geographical area; processing the first output and the weather data through a sequence optimization model to provide a second output, the second output comprising updated voyage plans for the plurality of vessels, wherein each of the initial voyage plans and each of the updated voyage plans defines a type of material, a quantity of material, a vessel, and a sequence of locations; and based on the updated voyage plans, transmitting, to computing systems of the plurality of vessels, instructions that cause the computing systems to adjust one or more settings of respective maneuvering systems of the vessels to voyage under the updated voyage plans.

Other implementations of this aspect include corresponding systems, apparatus, and computer programs, configured to perform the actions of the methods, encoded on computer storage devices.

These and other implementations can each optionally include one or more of the following features: the demand data comprises a plurality of demand elements, each demand element indicating a type of material, a quantity of material, and a location, wherein the location comprises a destination location or an originating location of the material; processing the demand data and the vessel data through a capacity optimization model to provide the first output comprises: generating, for each demand element, a preliminary voyage from a hub to the location indicated by the demand element, wherein the hub comprises an originating location of the plurality of vessels; iteratively performing voyage merges by: selecting, from the preliminary voyages, a pair of voyages; determining that the pair of voyages satisfies criteria for merging; and merging the pair of voyages into a combined voyage; the actions include, for each iteration of performing voyage merges: generating, from the vessel data, a mock vessel; and assigning the mock vessel to each preliminary voyage; the actions include: after merging the pairs of voyages, assigning the combined voyage to a vessel of the plurality of vessels based on the availabilities and capacities of the vessels; merging the pair of voyages comprises: joining a first demand element of a first voyage to a second demand element of a second voyage; each preliminary voyage comprises a sequence that begins and ends at the hub; the sequence includes a starting demand element that immediately follows the hub in the sequence; the sequence includes an ending demand element that immediately precedes the hub in the sequence; determining that the pair of voyages satisfies criteria for merging comprises determining that the first demand element and the second demand element are each either a starting demand element or an ending demand element; processing the first output and the weather data through a sequence optimization model to provide a second output comprises: using a genetic algorithm to optimize sequence factors including: an order of locations; a speed of travel between the locations; and a waiting time at each location; each of the plurality of vessels comprises an ocean-going vessel; the weather data comprises data indicating at least one of visibility, wave height, and wind speed.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

FIGS. 6A to 6C illustrate examples of mergeable and unmergeable voyages.

Like reference numbers and designations in the various drawings indicate like elements.

DETAILED DESCRIPTION

Implementations of the present disclosure are directed to improving efficiency in transporting material and/or personnel. More particularly, implementations of the present disclosure are directed to a logistical planning platform that optimizes voyage plans for delivering material to locations within a geographic region. The disclosed techniques can be used to generate and refine voyage plans, based on dynamic resource demand and transportation availability, for improved efficiency in shipping and reduced resource consumption (e.g., fuel, electricity).

The disclosed implementations can be used improve schedule reliability, transportation vessel idling time, fleet shipping capacity, and fuel consumption. Thus, implementations may reduce environmental impacts of transport vessels, such as reduced resource consumption, while improving operational efficiency and reducing costs of operating the transport vehicles. The disclosed techniques can be implemented to automatically determine updated voyage plans for transporting material to various locations according to the material demand, types of material, and capacities of available vessels. Initial voyage plans are generated, assigning material goods for transport on vessels. The initial voyage plans are optimized to reduce fuel consumption and cost of transportation. By generating initial voyage plans prior to optimization, the total set of possible voyage plans is reduced. Thus, the amount of data used is limited to the amount of data needed to perform the analyses. Voyage optimization is performed while accounting for previously optimized voyages, avoiding conflicts between newly generated voyages and previously generated voyages. The optimized voyage plans can be communicated to control systems of vessels configured for autonomous piloting. The logistical planning platform can automatically adjust voyage plans using updated data, such as updated weather data. The adjusted voyage plans can then be communicated to the vessels before a voyage, during a voyage, or both. When a change is detected in predicted environmental conditions, vessel voyage plans can be automatically updated in response to detecting the change. When a change is made to a voyage plan for a vessel, the system can automatically update voyage plans for the vessel and for other vessels to account for the change. The disclosed techniques improve the speed of generating and updating voyage plans, reducing time and cost for transporting material goods.

Figure 1:
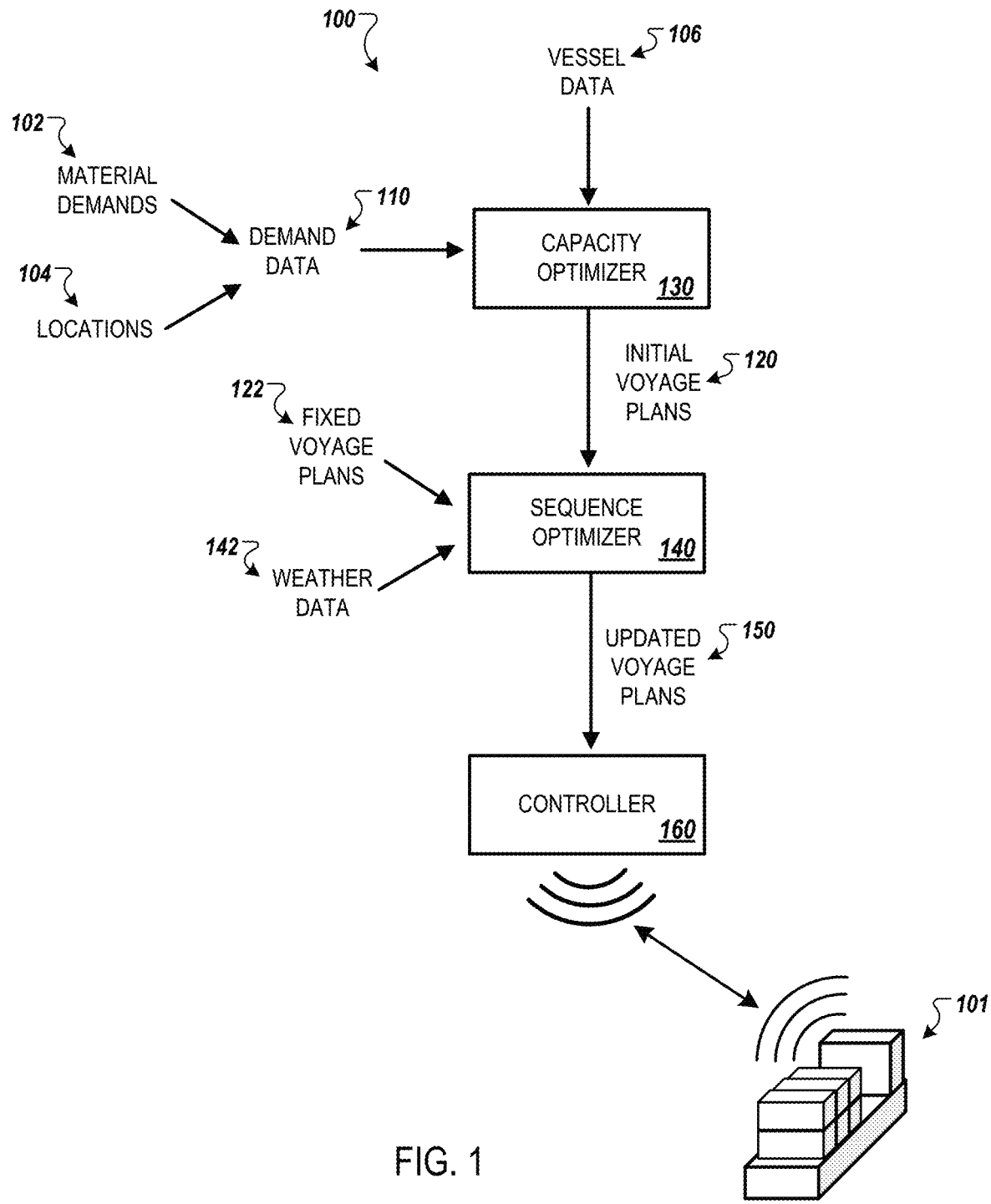
FIG. 1 depicts an example system for route planning for material shipping in accordance with implementations of the present disclosure.

FIG. 1 depicts an example system 100 for route planning for material shipping in accordance with implementations of the present disclosure. The system 100 includes a capacity optimizer 130, a sequence optimizer 140, a controller 160, and vessels 101.

The capacity optimizer 130 receives demand data 110. The demand data includes material demands 102 and locations 104. In some examples, the demand data 110 includes multiple demand elements, with each demand element including a material demand and a corresponding location, (e.g., a location to which the material demand is to be delivered or a location from which the material demand is to be picked up). The capacity optimizer 130 also receives vessel data 106, including capacities for the different materials, availabilities, and planned maintenance dates. The capacity optimizer 130 processes the demand data 110 and the vessel data 106 to produce initial voyage plans 120.

The sequence optimizer 140 receives the initial voyage plans 120 and fixed voyage plans 122. Fixed voyage plans can include plans for voyages that have already started, or will start in the near future (e.g., within three days), that have already been optimized, and that overlap the optimization period. The sequence optimizer 140 also receives weather data 142. The sequence optimizer processes the initial voyage plans 120, the fixed voyage plans 122, and the weather data 142 to produce updated voyage plans 150. The sequence optimizer 140 can provide the updated voyage plans to the controller 160.

The vessel 101 communicates remotely with the controller 160. In some examples, the vessel 101 can communicate with the controller 160 over a network. In some implementations, the network can include a large computer network, such as a local area network (LAN), a wide area network (WAN), radio communications, satellite communications, the Internet, a cellular network, or a telephone network (e.g., PSTN).

The controller 160 can perform functions such as tracking and directing movement of the vessels. The controller 160 can include one or more server devices and databases (e.g., processors, memory). In some implementations, the controller 160 includes at least one server and at least one data store. In the example of FIG. 1, the controller 160 is intended to represent various forms of servers including, but not limited to a web server, an application server, a proxy server, a network server, and/or a server pool. In some examples, the controller 160 can be located remotely from the other components of the system 100. For example, the controller 160 may be located at a shipping port, at another land location, or at a sea-based location. In some examples, the controller 160 can be cloud-based.

In some examples, the vessel 101 includes a wireless communication module. Each wireless communication module can be configured to enable communication between the vessel 101 and the controller 160, to enable communication between the vessel 101 and other marine vessels, and to enable communication between the vessel 101 and shore facilities.

The system 100 can be implemented to optimize two or more different optimization functions, to include at least the number of vessels employed and the operational cost of the voyages.

Figure 2:
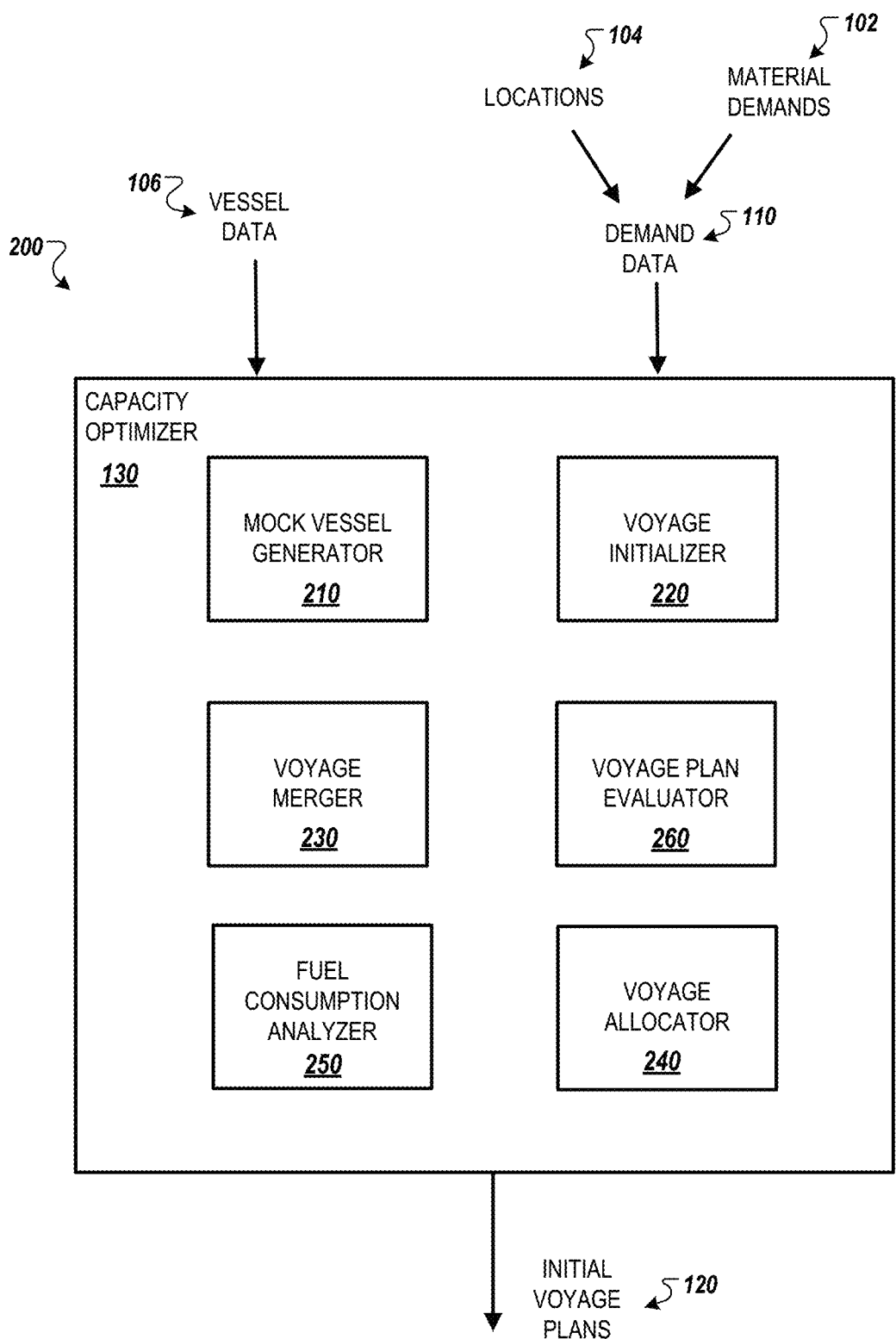
FIG. 2 depicts an example conceptual architecture of a capacity optimizer in accordance with implementations of the present disclosure.

FIG. 2 depicts an example conceptual architecture 200 of the capacity optimizer 130. As described with reference to FIG. 1, the capacity optimizer 130 receives demand data 110 and vessel data 106 and outputs initial voyage plans 120.

The capacity optimizer 130 can be used to implement a capacity optimization model. The capacity optimizer 130 includes a mock vessel generator 210, a voyage initializer 220, a voyage merger 230, a voyage allocator 240, a fuel consumption analyzer 250, and a voyage plan evaluator 260. The capacity optimizer 130 produces a set of route-vessel allocations that covers expected demand for a period of time. For example, the capacity optimizer 130 can produce a set of route-vessel allocations for the following month, (e.g., on a weekly basis).

The capacity optimizer 130 runs the capacity optimization model in order to minimize the number of vessels that are used to accommodate the demand. The capacity optimization can include, for example, a savings algorithm such as a modified version of the Clarke-Wright heuristic algorithm. The optimized routes result in reduced costs. Each route-vessel allocation produced by the capacity optimizer 130 includes a route specifying a sequence of locations starting on a given date. Each route-vessel allocation also specifies demand elements carried during the voyage.

The capacity optimizer 130 can apply constraints to the voyages. For example, constraints can include vessel capacity by material, vessel availabilities, demand coverage, and time limits for each voyage. An example constraint for vessel capacity by material is that a particular vessel has a maximum capacity for water of seven hundred gallons. An example constraint for vessel availabilities is that a specific vessel is only available for the first three weeks of a certain month. An example constraint for demand coverage is a constraint that all demand must be covered. An example constraint for time limits is a constraint that each route must take no longer than seven days.

Figure 3:
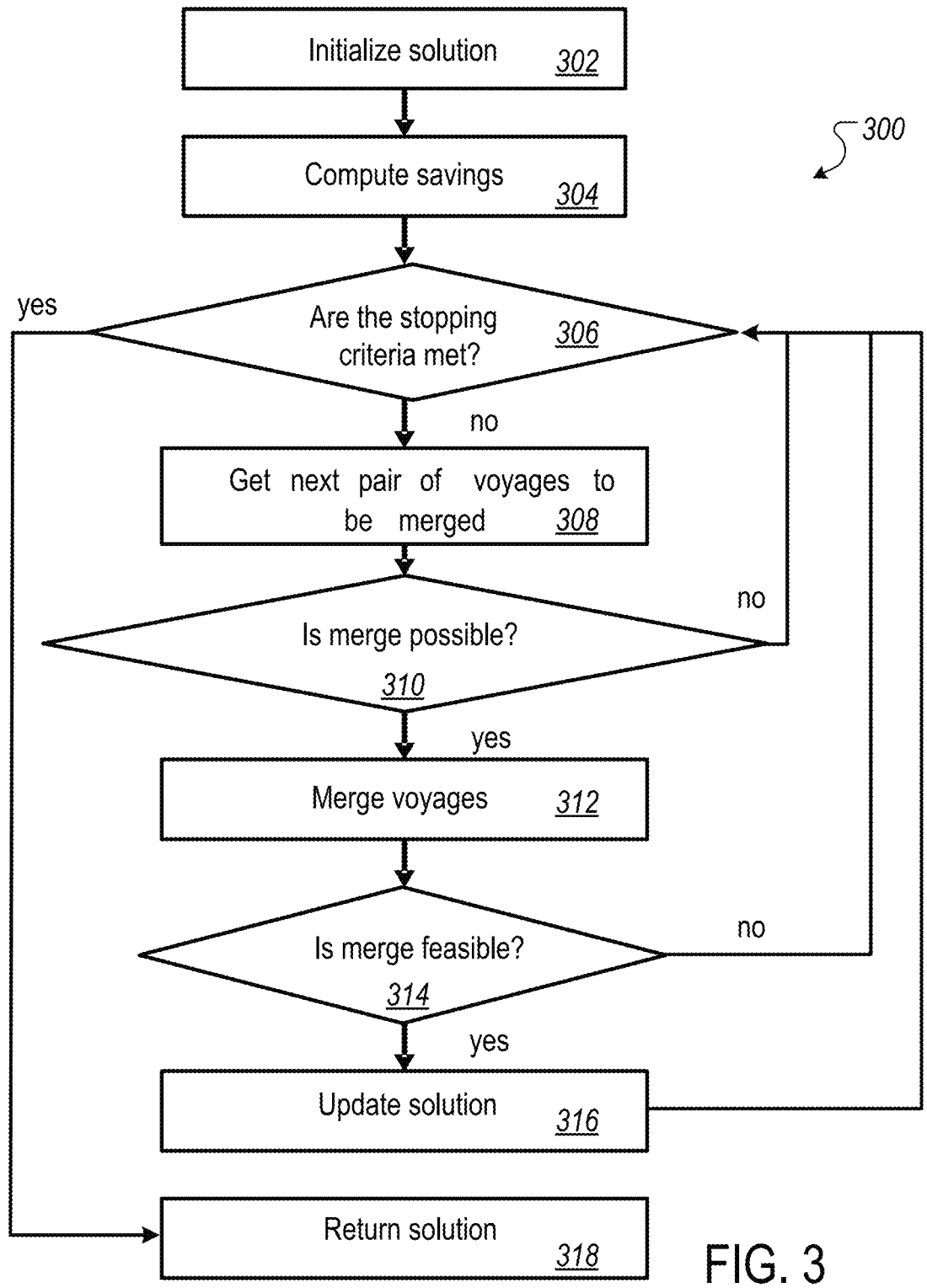
FIG. 3 is a flowchart of an example capacity optimization process that can be executed in accordance with implementations of the present disclosure.

FIG. 3 is a flowchart of an example capacity optimization process 300 that can be executed in accordance with implementations of the present disclosure. In general, the process 300 includes creating one route for each demand element, and computing a matrix with savings obtained from merging each pair of demand elements into the same route. The process 300 includes selecting with a degree of randomness, one of the top options. If the new route is feasible in terms of length and capacity, the route is accepted. Otherwise, the route is discarded. These steps can be carried out iteratively. When the number of routes is below the maximum number of vessels available, each iteration will be followed by an allocation problem, where each route is assigned to one of the vessels. If any of the routes does not fit to an available vessel, the new merge is discarded.

In greater detail, the voyage initializer 220 initializes a solution (302) based on the demand data 110. The demand data 110 represents types of material and quantities of material demanded for each of a plurality of locations within a geographical area. The demand data 110 includes a plurality of demand elements. Each demand element indicates a type of material, a quantity of material, and a location.

The location of a demand element can identify a destination location or an originating location of the material. When the location identifies the destination location of the material, the material can be classified as payload (e.g., material being moved from an on-shore origin to an off-shore platform). When the location identifies the originating location of the material, the material can be classified as backload (e.g., material being moved from an off-shore platform back to the on-shore origin). As an example, a first demand element can indicate that a first location has a demand for payload of one hundred gallons of base oil, and a demand for backload of eight hundred gallons of brine. The hub is an originating location of the vessels, such that each voyage ultimately starts and ends at the hub location. The hub location can be, for example, a depot where vessels onload and offload materials.

The voyage initializer initializes a solution for accommodating the demand indicated by the demand data 110. In some examples, to initialize the solution, a preliminary voyage is created for each demand element within a time period such as a week. The preliminary voyages can include, for each demand element, one vessel transiting from the hub to a location identified by the demand element and then returning to the hub. The initialized solution thus assigns one vessel and one preliminary voyage for each demand element.

As more voyages than available vessels are created, the voyage initializer can assign each preliminary voyage to a dummy vessel, or mock vessel. The available fleet of vessels is limited and each vessel has specific characteristics, to include availabilities, capacities, and ability to carry various commodities. For each iteration, a mock vessel can be generated by the mock vessel generator 210 by sampling from the characteristics of the real fleet of vessels, with the aim of creating voyages that are later allocated to real vessels. The mock vessel can be created with sampled characteristics from the real fleet distribution (e.g., as specified by the vessel data 106). Thus, a respective mock vessel for a first iteration can be different from a respective mock vessel for a second iteration. In some examples, the mock vessel is assigned to each voyage, except for a random selection of voyages that are allocated to real available vessels.

The vessel data 106 represents availabilities and capacities of multiple vessels. The vessel data 106 can also include, for each vessel, a vessel ID, a vessel type, a capacity by material, a pump transfer rate, a vessel size, a vessel speed, on-hire and off-hire dates, and a maintenance plan for the vessel. The vessel data 106 can also include fuel consumption data indicating anchorage fuel consumption, standby fuel consumption, cargo fuel consumption, and full engine speed fuel consumption.

Steps 306 to 316 of the process 300 can be performed iteratively in a multi-start approach. In each iteration, voyage merges are proposed and analyzed. For merges that are possible and feasible, the solution is updated (316), and if the stopping criteria are not met (306), the cycle repeats.

The voyage merger 230 iteratively performs voyage merges. The voyage merger 230 first considers potential voyage merges and computes expected savings (304) of the potential merges. For each pair of locations, the savings of merging two demand elements into the same route can be computed as the cost of performing one common voyage subtracted from the cost of performing two different voyages. The cost can represent any cost function, (e.g., operational costs, time cost, distance cost)

Figure 4A:
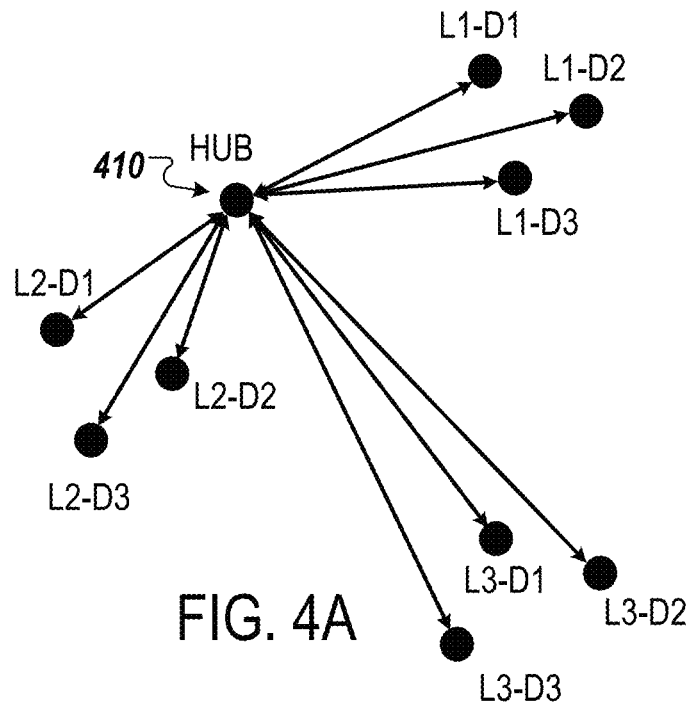
FIGS. 4A and 4B illustrate an example merger of preliminary voyages.
Figure 4B:
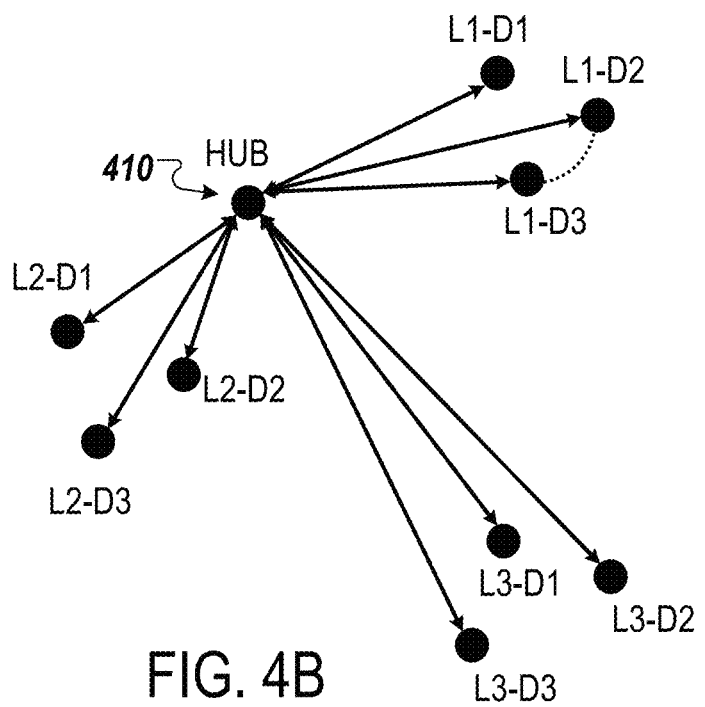

For example, referring to FIGS. 4A and 4B, the voyage merger 230 can compute the potential savings of merging a pair of voyages, including L1-D2 and L1-D3, into a combined voyage. Merging the pair of voyages includes joining a first demand element of a first voyage to a second demand element of a second voyage. The savings can be computed based on first determining a total cost of transit from hub 410 to L1-D2 and back, and from the hub 410 to L1-D3 and back. The voyage merger 230 can then determine the cost of transit from the hub 410 to L1-D2, then to L1-D3, and then back to the hub 410.

For each iteration of the multi-start algorithm, the voyage merger 230 selects, from the preliminary voyages, a pair of voyages (308) and determines whether the pair of voyages satisfies criteria for merging. The selection of pairs can be performed through biased randomization using a geometric distribution. A voyage pair can include two different voyages that each start and end at the hub 410, and include one or more demand elements and one or more locations. The voyage merger 230 can select pairs of voyages based on sorting voyage pairs according to the merge criteria. For example, each pair of voyages can be assigned a merge score based on a degree of satisfaction of merge criteria. The voyage merger 230 can select a pair of voyages to merge based at least in part on the merge score of the pair of voyages.

Merge criteria can include, for example, whether the demand elements of the voyage pair are carried by a mock and a real vessel respectively. If one demand element of the pair is carried by a mock vessel, and another demand element is carried by a real vessel, there is a higher probability of the pair being selected. Merge criteria can also include a savings value for the merge. A higher cost savings for a merge of a pair of voyages results in a higher probability of the pair being selected. Merge criteria can also include whether all demand elements of the pair of voyages are located in the same location. All demand elements being located in the same location results in a higher probability of the pair being selected. Merge criteria can also include whether all demand elements of the pair of voyages are from the same commodity, or type of material. All demand elements being from the same commodity results in a higher probability of the pair being selected. Merge criteria can also include whether one of the demand elements is payload and another is backload. If one of the demand elements is payload, and another is backload, there is a higher probability of the pair being selected.

Figure 5A:
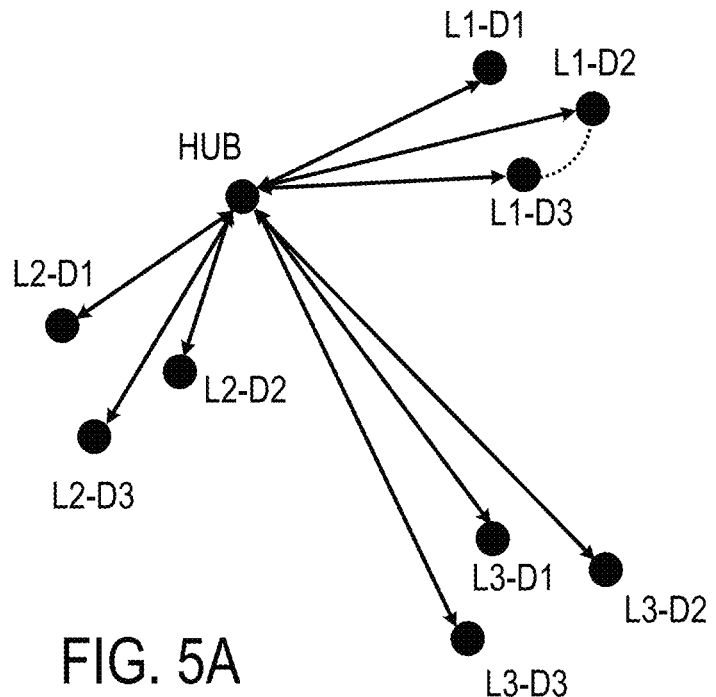
FIGS. 5A and 5B illustrate an example merger of voyages.
Figure 5B:
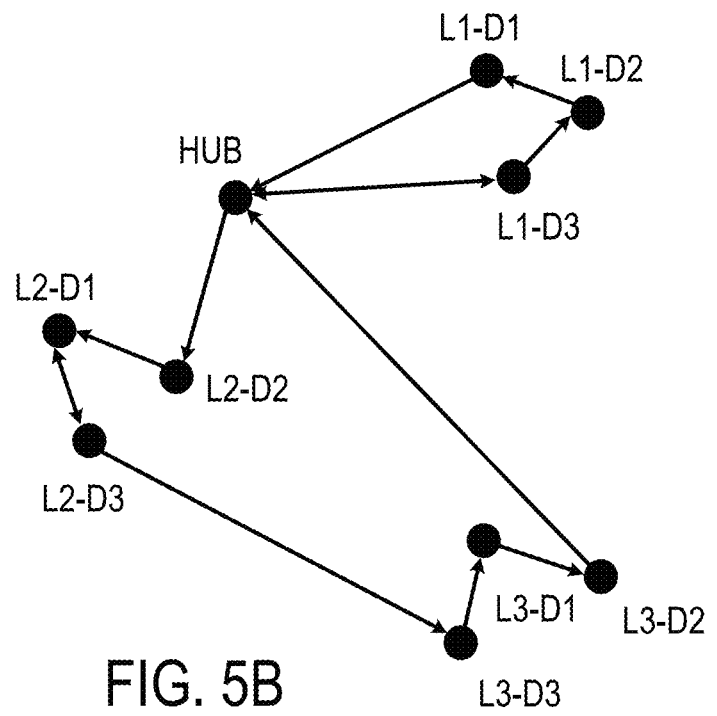

Referring to FIGS. 5A and 5B, in a first round of iterations, the voyage merger 230 can determine to merge voyages L1-D1, L1-D2, and L1-D3 into a single voyage. The voyage merger 230 can also determine to merge voyages L2-D1, L2-D2, L2-D3, L3-D1, L3-D2, and L3-D3 into a single voyage.

For each selected merger of voyage pairs, the voyage merger 230 determines whether a merge is possible (310). In general, in order to merge a pair of voyages, the demand elements that are to be joined must be exterior nodes of the voyage. An exterior node is a node that is at an adjacent position of the hub in the sequence of locations of the voyage.

In greater detail, and referring to FIGS. 6A to 6C, each voyage includes a sequence that begins and ends at the hub 610. The sequence includes a starting demand element that immediately follows the hub in the sequence. For example, Voyage 1 of FIG. 6A includes starting demand element L2-D2, and Voyage 2 of FIG. 6A includes starting demand element L1-D3. The sequence also includes an ending demand element that immediately precedes the hub in the sequence. For example, Voyage 1 of FIG. 6A includes ending demand element L3-D2, and Voyage 2 of FIG. 6A includes ending demand element L1-D1. In some examples, a voyage may include only one demand element, in which case the starting demand element and the ending demand element can be the same demand element.

Merging the Voyage 1 with Voyage 2 includes joining a first demand element of Voyage 1 to a second demand element of Voyage 2. To determine that merging Voyage 1 and Voyage 2 is possible, the voyage merger 230 determines whether the first demand element of Voyage 1 and the second element of Voyage 2 are each an exterior node. A demand element is an exterior node when the demand element is either a starting demand element or an ending demand element.

For example, in FIG. 6A the voyage merger 230 is considering joining L3-D2 of Voyage 1 with L1-D2 of Voyage 2. Joining L3-D2 of Voyage 1 with L1-D2 of Voyage 2 would cause the vessel to transit from L3-D2 directly to L1-D2. The demand element L1-D2 of Voyage 2 is an interior node of Voyage 2, because it is neither a starting demand element nor an ending demand element. Thus, merging Voyage 1 and Voyage 2 by merging L3-D2 with L1-D2 is not possible, as the combined voyage would omit demand element L1-D3. If the proposed merger is not possible, the pair is discarded and the voyage merger selects a new pair of voyages to evaluate for merging.

In the example of FIG. 6B, the voyage merger is considering joining L3-D2 of Voyage 1 with L1-D3 of Voyage 2. Joining L3-D2 of Voyage 1 with L1-D3 of Voyage 2 would cause the vessel to transit from L3-D2 directly to L1-D3. The demand elements L3-D2 and L1-D3 are both external nodes, (e.g., L3-D2 is an ending demand element and L1-D3 is a starting demand element). Thus, merging Voyage 1 and Voyage 2 by joining L3-D2 with L1-D3 of Voyage 2 is possible.

In some examples, merges involving interior nodes are possible as long as one of the two voyages has only two edges. For example, referring to FIG. 6C, Voyage 2 includes two edges (the hub 610 and node L1-D7). Thus, the demand element L1-D7 can be joined to the demand element L1-D2, even though the demand element L1-D2 is an internal node of Voyage 1. Therefore, merging Voyage 1 and Voyage 2 by joining L1-D7 to L1-D2 is possible.

Figure 6E:
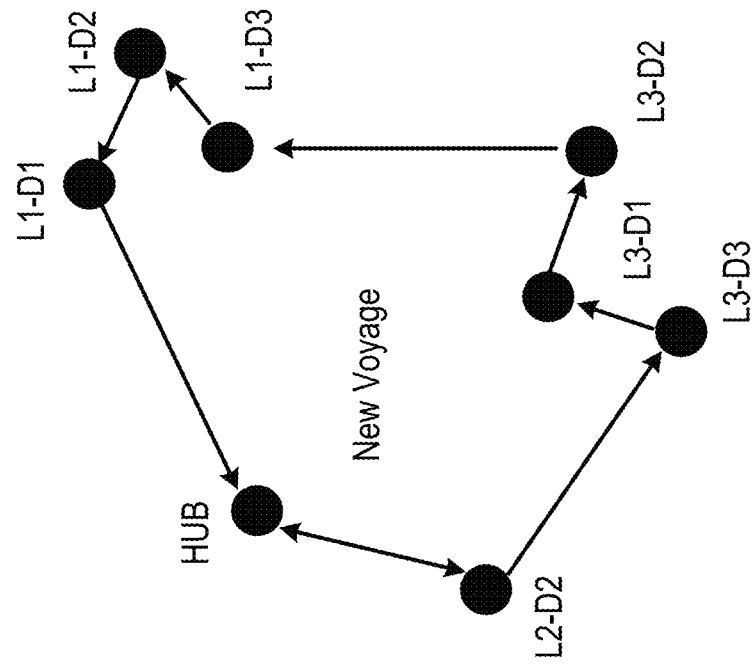
FIGS. 6D and 6E illustrate an example merger of voyages.
Figure 6D:
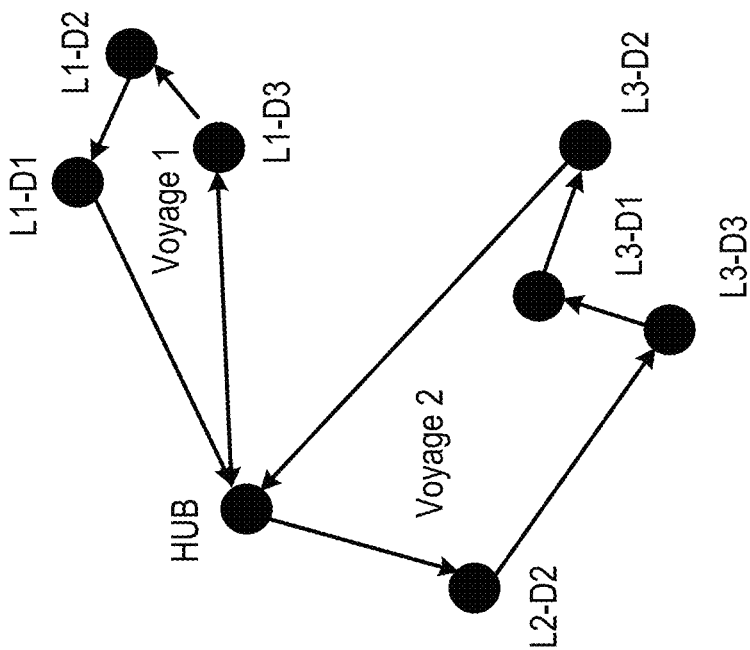

Referring to FIGS. 6D and 6E, the voyage merger 230 merges the pair of voyages (312) into a combined voyage. For example, the voyage pair can be concatenated, such that the last location of the first voyage is followed by the first location of the second voyage. The combined voyage, shown in FIG. 6E, includes demand element L3-D2 joined with element L1-D3. When merged, the schedule of the second part of the voyage (e.g., demand elements previously assigned to Voyage 1) is updated to be consistent with departure times of the first part of the combined voyage (e.g., demand elements previously assigned to Voyage 2).

The voyage plan evaluator evaluates the combined voyages generated by the voyage merger 230. The voyage plan evaluator can evaluate the combined voyages by determining whether the combined voyages are feasible (314).

A combined voyage is considered feasible if the resulting voyage satisfies constraints. Constraints can include, for example, a constraint that the voyage has an elapsed time of seven days or less. Another example constraint is that the combined voyage does not exceed vessel availability. Another example constraint is that all capacity constraints for both upperdeck and underdeck of the vessels are met, considering payload and backload at each location. The fuel consumption analyzer 250 evaluates a fuel consumption of each voyage. In some examples, the voyage plan evaluator 260 applies fuel consumption constraints.

In some examples, the voyage plan evaluator 260 may determine that the combined voyages do not satisfy constraints. If the constraints are not satisfied, the voyage merger selects a new pair of voyages to evaluate for merging.

The voyage allocator 240 allocates the resulting set of combined voyages to the available fleet of vessels based on the vessel data 106. The voyage allocator uses a heuristic algorithm that, given all the available vessels, allocates one vessel to each voyage. The selection of vessels for allocation can be performed through biased randomization using a geometric distribution. The heuristic algorithm considers factors such as material types that can be carried by each vessel, and capacities of each vessel for each material type. In some examples, the voyage allocator maximizes vessel occupation, in order to select the smallest number of vessels possible to meet the demand.

If the merge is feasible, and the voyage plan evaluator determines that the combined voyage satisfies constraints, the solution is updated (316). To update the solution, the combined voyage is included in the solution, and the previous voyages are removed. Stopping criteria for the iterative process can include that no remaining savings remain to be evaluated (e.g., no further voyages can be merged). When stopping criteria is met (306), a solution is returned (318), and the internal structures and metrics of the global solution are updated accordingly.

The capacity optimizer 130 provides a top solution and an alternative solution to choose from, and provides relevant metrics for comparison. In some examples, the top solution is the solution that minimizes the number of vessels. The alternative solution can be the solution that minimizes cost, or the next best solution available after the top solution. Some of the routes created are repeated across a period of time, such as a month. In an example scenario, a solution includes twenty routes, three of which are repeated once during a month-long period of time.

Figure 7:
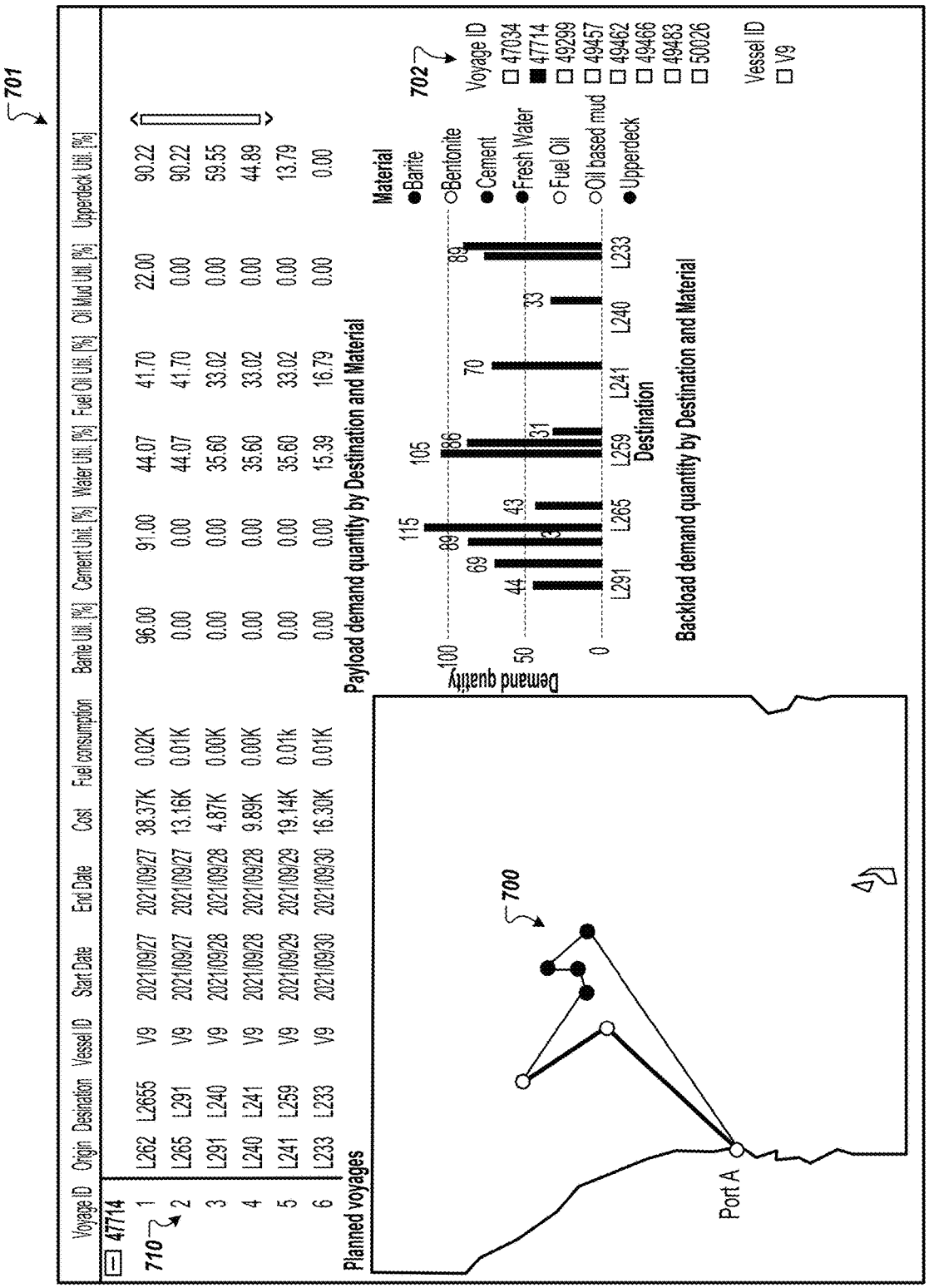
FIG. 7 shows an example initial voyage plan.

The capacity optimizer 130 provides a first output including initial voyage plans for the vessels. FIG. 7 shows an example initial voyage plan 700 for a vessel. The voyage plan includes seven legs 710 of a voyage for a vessel having Vessel ID of V9. The voyage has a Voyage ID of 47714. The initial voyage plan 700 departs from and ends at the same location of Port A.

The initial voyage plan 700 is presented in a user interface 701. The user interface can be provided on a display of a computing device. The user interface 701 includes selectable icons 702 for different Voyage IDs. In response to a user selecting a selectable icon for a particular Voyage ID, the user interface 701 can display information related to the initial voyage plan for the selected Voyage ID.

The user interface 701 shows information for each leg 710 of the initial voyage plan 700. For example, for each leg 710, the user interface 701 displays an origin, destination, vessel ID, start date, end date, predicted cost, and predicted fuel consumption. The user interface 701 also shows a payload demand quantity and backload demand quantity by Destination and Material. The user interface 701 shows utilization rates for vessel capacities during each leg. For example, the user interface 701 shows utilization rates for Barite, Cement, Water, Fuel Oil, Oil Mud, and Upperdeck space.

Each initial voyage plan for a Voyage ID can include and origin, destination, start date, end date, utilization by material, predicted cost, and predicted fuel consumption. Each initial voyage plan can define a type of material, a quantity of material, a vessel, and a sequence of locations. The capacity optimizer 130 can also provide, for each demand element, a vessel identification, a voyage identification, a demand quantity, a deck type, and whether the demand element is backload or payload. The capacity optimizer 130 can also output data representing a scenario of multiple combined voyages. The data can indicate, for example, a number of vessels, total cost, allocated demand, number of routes, total distance, and total fuel consumption.

The first output and the weather data are processed through a sequence optimization model (e.g., run by the sequence optimizer 140). The sequence optimization model provides a second output. The second output includes updated voyage plans 150. The sequence optimizer uses a genetic algorithm to optimize sequence factors of the voyage plans. The sequence factors can include an order of locations, a speed of travel between the locations, and a waiting time at each location.

Figure 8A:
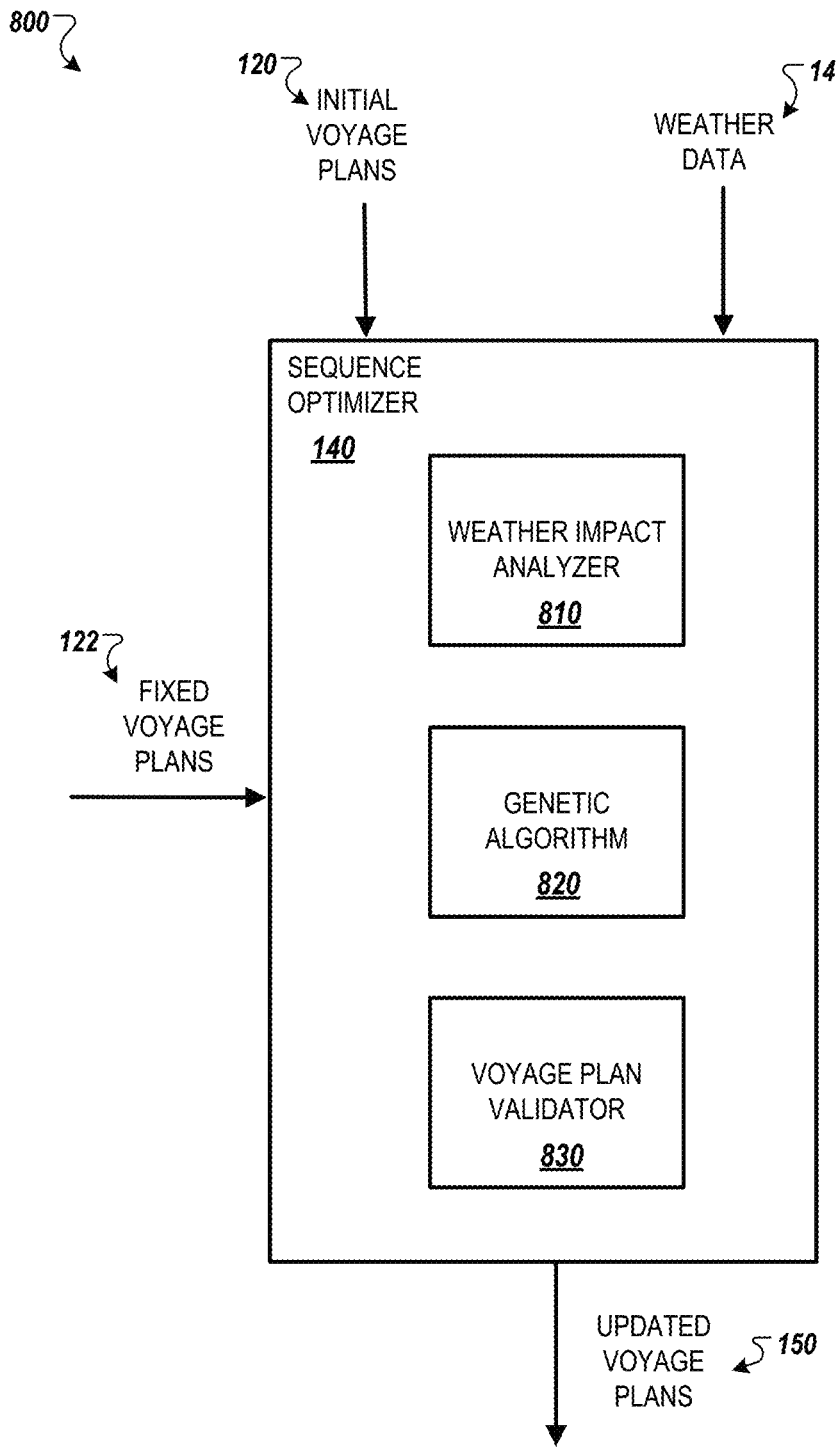
FIG. 8A depicts an example conceptual architecture of a sequence optimizer in accordance with implementations of the present disclosure.

FIG. 8A depicts an example conceptual architecture 800 of the sequence optimizer 140. The sequence optimizer 140 receives the initial voyage plans 120, the fixed voyage plans 122, and the weather data 142. The sequence optimizer 140 can be used to implement a sequence optimization model using a weather impact analyzer 810, a genetic algorithm 820, and a voyage plan validator 830. The sequence optimizer 140 outputs the updated voyage plans 150 (e.g., to the controller 160).

The sequence optimizer 140 can perform an optimization process shortly before the start of the first voyage of the initial voyage plans 120. For example, the sequence optimizer 140 can perform the optimization process approximately three days before start of first voyage. The sequence optimization adapts the initial voyage plans 120 based on the weather forecast represented by the weather data 142, and based on synchronizing and deconflicting schedules of individual vessels.

The fixed voyage plans 122 can include voyages that have been pre-planned. For example, the fixed voyage plans 122 can include past-planned voyages that have already started or will start soon, (e.g., less than 3 days). The fixed voyage plans 122 overlap the optimization period. The optimization period can be, for example, a period from three days in the future to ten days in the future. The vessels assigned to the fixed voyage plans 122 may be scheduled to perform operations at the same locations as the vessels assigned to the initial voyage plans 120. Thus, the sequence optimizer 140 can adapt the sequences of the initial voyage plans 120 to deconflict with the fixed voyage plans 122.

The sequence optimizer considers multiple decision variables (e.g., a sequence of locations, a vessel speed for each voyage segment, and a waiting time at each location). A goal of the sequence optimizer 140 is to minimize total fuel consumption cost for all voyages.

The sequence optimizer 140 optimizes the initial voyage plans 120 based on various constraints and considerations. For example, weather can affect both enroute speed and the times during which a vessel can perform operations. The speed of the vessel is also limited based on its characteristics. The end of one voyage occurs before the start of the next voyage, or the end of a seven-day period. Material transfer time can be performed in one single block, or split before the end of one working shift and after the start of the next working shift, depending on the working hours of each specific location. Two vessels might not be able to perform operations at the same location simultaneously.

In some examples, the weather data 142 includes historical weather data representing historical weather conditions within the geographical area of the locations. In some examples, the weather data includes weather forecast data representing predicted weather conditions within the geographical area. The weather data 142 can include data indicating at least one of visibility, wave height, wave direction, wind speed, and wind direction.

The weather impact analyzer 810 analyzes the weather data 142 to predict impacts on the vessels. For example, the weather impact analyzer 810 can use the wind direction and speed to compute the wind effect. The weather impact analyzer 810 can use the wave direction and height to compute the wave effect. Both wave and wind effect can be added to the engine speed to compute travel time of the vessel between two locations.

The weather impact analyzer 810 can use the weather data 142 to determine when, where, and whether material transfer can take place. The weather impact analyzer 810 can apply assumptions, such as an assumption that the material transfer cannot be performed when weather conditions are unsuitable. Unsuitable weather conditions can include, for example, horizontal visibility less than 500 meters, wave height greater than 2.5 meters, and wind speed greater than 25 knots. Another assumption is that material transfer can be performed intermittently (e.g., material transfer can be paused during unsuitable weather conditions, and restarted when the weather conditions are suitable). In an example, an ideal material transfer time may be five hours, but with intermittent unsuitable weather, final material transfer time may be eight hours.

The sequence optimizer 140 can employ a genetic algorithm 820 to optimize the initial voyage plans 120. In some examples, the initial voyage plans 120 are randomly sorted in multi-start iterations, and the genetic algorithm 820 is used to optimize each voyage. The genetic algorithm 820 can be implemented to optimize at least three variables, including the order of locations to be visited by a vessel, the speed of the vessel during each trip between sequential locations, and a waiting time of the vessel at each location.

The optimization process can randomly sort all voyages to be optimized. For each voyage to optimize, the genetic algorithm 820 updates location availabilities to block moments at which the vessel is performing operations. Multiple custom mutations are used to improve the solution in each generation. In an example where there is stand-by time at one location, the voyage plan can be optimized by reducing the engine speed of the previous trip. Thus, the genetic algorithm can be used to determine optimal speed between locations, such that waiting times are reduced or eliminated.

In some examples, the sequence, speed, and waiting time for a vessel can be represented by a vector. For example, a vector can be represented as:

$<L1, W1, S1, L2, W2, S2, L3, W3, S3, L4, W4, S4>$ where L1, L2, and L3 represent locations, W1, W2, and W3 represent waiting times at the respective locations, and S1, S2, and S3 represent a sequence number of the respective locations.

The following vector can represent a first voyage for a first vessel:

$<2, 3, 12, 1, 13, 8, 3, 30, 3, 4, 4, 18>$

Thus, for the first voyage, L2 is the first location in the sequence, L1 is the second location in the sequence, and L3 is the third location in the sequence. The waiting time W3 of the first vessel at location L3 is 30 hours. The speed from L1 to L3 is twelve knots. Thus, an optimization can be performed that decreases the speed S1 from twelve knots to a slower speed, in order to decrease the waiting time W3 to a number less than thirty hours.

The genetic algorithm 820 can apply mutations and crossovers to obtain a selection of intermediate solutions. The genetic algorithm 820 can perform an iterative process to obtain a best-found solution.

In some examples, an objective function of the genetic algorithm 820 can be computed as the sum of the cost of the different fuel consumption terms. The fuel consumption terms can be related to each of the following activities: anchorage, stand-by, enroute (including weather effect on speed), and material transfer. The genetic algorithm 820 can handle infeasible solutions by adding a penalization to the value of the objective function.

The voyage plan validator 830 validates the voyage plans generated by the genetic algorithm 820. The voyage plan validator 830 can validate the voyage plans by applying constraints. Hard constraints can be enforced through the evaluation of each individual voyage. For example, a hard constraint may be that no operations can be performed with bad weather conditions or if another vessel is already performing operations at one location. Soft constraints can be enforced through parametrized penalties, in order to ensure that each of them is prioritized according to criteria and enabling the genetic algorithm to explore the space of infeasible solutions An example constraint is a capacity constraint, such that each vessel cannot carry material that exceeds the capacity of the vessel. A voyage length constraint can be applied that limits the voyage length to a total amount of time, e.g., seven days. In some examples, the voyage length constraint can limit the voyage length such that the voyage ends before a specified date. In some examples, the voyage length constraint can limit the voyage length such that the voyage ends before a next voyage of the vessel begins. A weight constraint can be applied that limits the weight of the material carried by the vessel to a specified upper limit.

The sequence optimizer 140 outputs updated voyage plans 150. The updated voyage plans 150 include voyage plans that have been optimized by the genetic algorithm 820 and validated by the voyage plan validator 830.

Each voyage plan of the updated voyage plans 150 defines a type of material, a quantity of material, a vessel, and a sequence of locations. Each updated voyage plan can also include data specifying an origin, destination, start date, end date, utilization by material, cost, fuel consumption, or any of these. In some examples, the updated voyage plans 150 include data specifying, for each demand element, a vessel identification, a voyage identification, a demand quantity, a deck type, and whether the demand element is backload or payload. The updated voyage plans 150 can also include data representing a global output for the voyage scenario.

The global output can include the number of vessels, total cost, allocated demand, number of routes, total distance, total fuel consumption, or any of these.

Figure 8B:
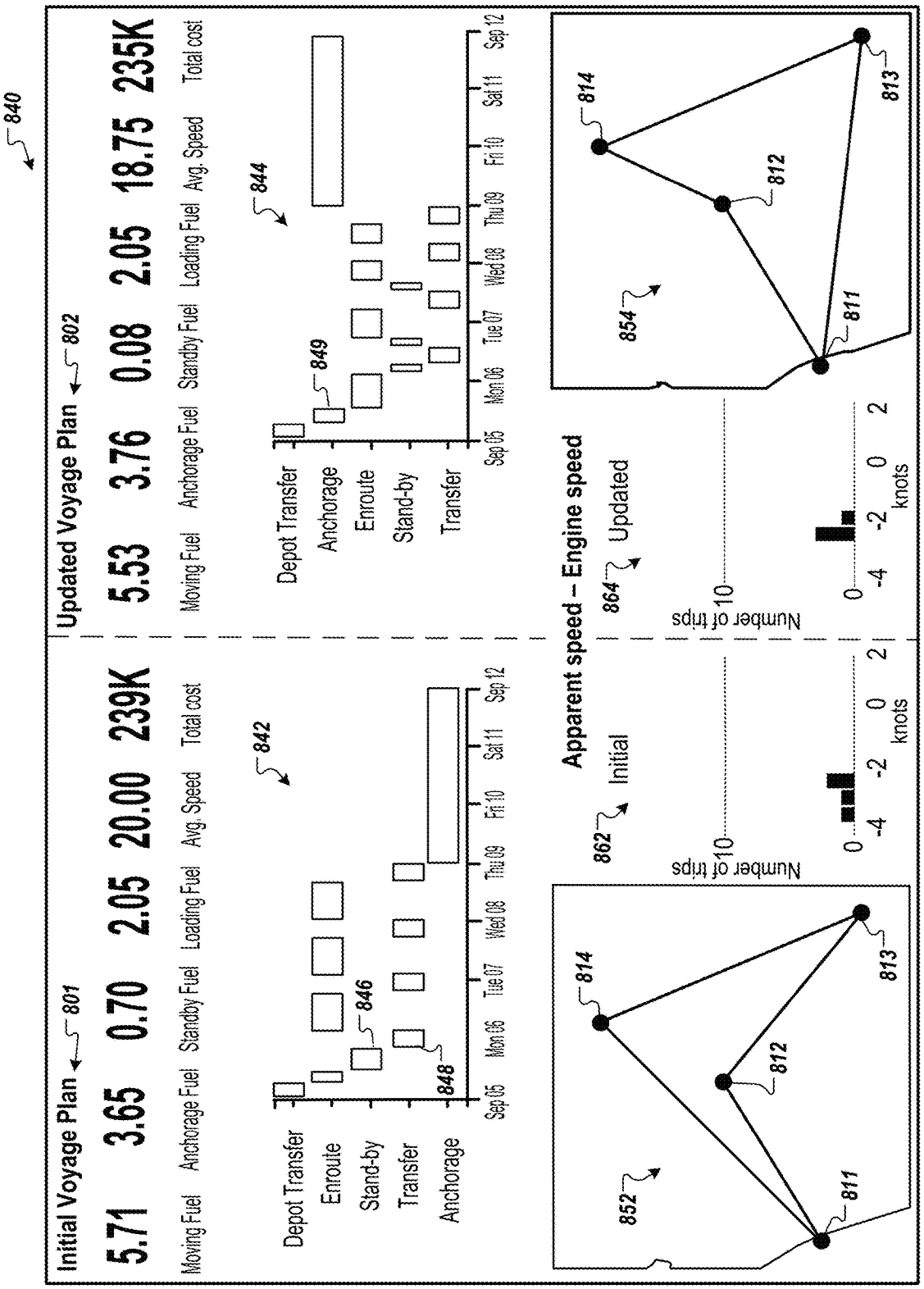
FIG. 8B shows an example updated voyage plan compared to an initial voyage plan.

FIG. 8B shows an example updated voyage plan 802 compared to an initial voyage plan 801 for a vessel. The initial voyage plan 801 and the updated voyage plan 802 are shown on a user interface 840. The user interface 840 shows information related to the initial voyage plan 801 and the updated voyage plan 802, such as fuel consumption, average speed, and cost. The user interface 840 shows a schedule 842 for the initial voyage plan 801 and a schedule 844 for the updated voyage plan 802. The user interface 840 shows a map 852 for the initial voyage plan 801 and a map 854 for the updated voyage plan 802. The user interface 840 shows a graph of the difference between apparent speed and engine speed for the initial voyage plan (graph 862) and for the updated voyage plan (graph 864).

The initial voyage plan 801 starts and stops at a depot 811. The initial voyage plan 801 includes a first leg from depot 811 to node 812. As shown in the schedule 842, the vessel is predicted to be in standby 846 at the node 812 before being able to conduct the scheduled transfer 848 at the node 812. The initial voyage plan 801 includes a second leg from node 812 to node 813, a third leg from node 813 to node 814, and a fourth leg from node 814 to depot 811.

As shown in the graph 862, in the initial voyage plan 801, wind and waves are predicted to significantly reduce apparent vessel speed compared to engine speed, such that the difference between apparent speed and engine speed is between −2 knots and −4 knots throughout the initial voyage plan 801.

The moving fuel for initial voyage plan 801 (e.g., the fuel consumed while enroute between nodes) is predicted to be 5.71 tons. The standby fuel for initial voyage plan 801 (e.g., the fuel consumed while waiting at a node) is predicted to be 0.70 tons. The average speed of the vessel while enroute during initial voyage plan 801 is predicted to be 20.00 knots. The total cost of initial voyage plan 801 is $239K.

The sequence optimizer 140 generates the updated voyage plan 802 to reduce fuel consumption and cost compared to the initial voyage plan 801. Compared to the initial voyage plan 801, the sequence of the nodes is changed in order to avoid bad weather conditions. Additionally, an anchorage time 849 is added to the beginning of the voyage to reduce the amount of standby time during the voyage. Average speed is decreased, reducing stand-by and moving fuel consumption.

The updated voyage plan 802 starts and stops at a depot 811. As shown in the schedule 844, the updated voyage plan 802 includes an anchorage 849 at the depot before proceeding enroute to the node 813. The updated voyage plan 802 includes a first leg from depot 811 to node 813, a second leg from node 813 to node 814, a third leg from node 814 to node 812, and a fourth leg from node 812 to depot 811.

As shown in the graph 864, in the updated voyage plan 802, wind and waves are predicted to have less of an effect on apparent vessel speed compared to the initial voyage plan 801. The difference between apparent speed and engine speed is between −2 knots and −3 knots throughout the updated voyage plan 802. Therefore, the impact of weather is significantly reduced.

The moving fuel for updated voyage plan 802 (e.g., the fuel consumed while enroute between nodes) is predicted to be 5.53 tons. The standby fuel for updated voyage plan 802 (e.g., the fuel consumed while waiting at a node) is predicted to be 0.08 tons. The average speed of the vessel while enroute during updated voyage plan 802 is predicted to be 18.75 knots. The total cost of updated voyage plan 802 is $235K. Executing the updated voyage plan 802 instead of the initial voyage plan 801 therefore results in a reduction of total fuel consumption for the voyage.

Figure 9:
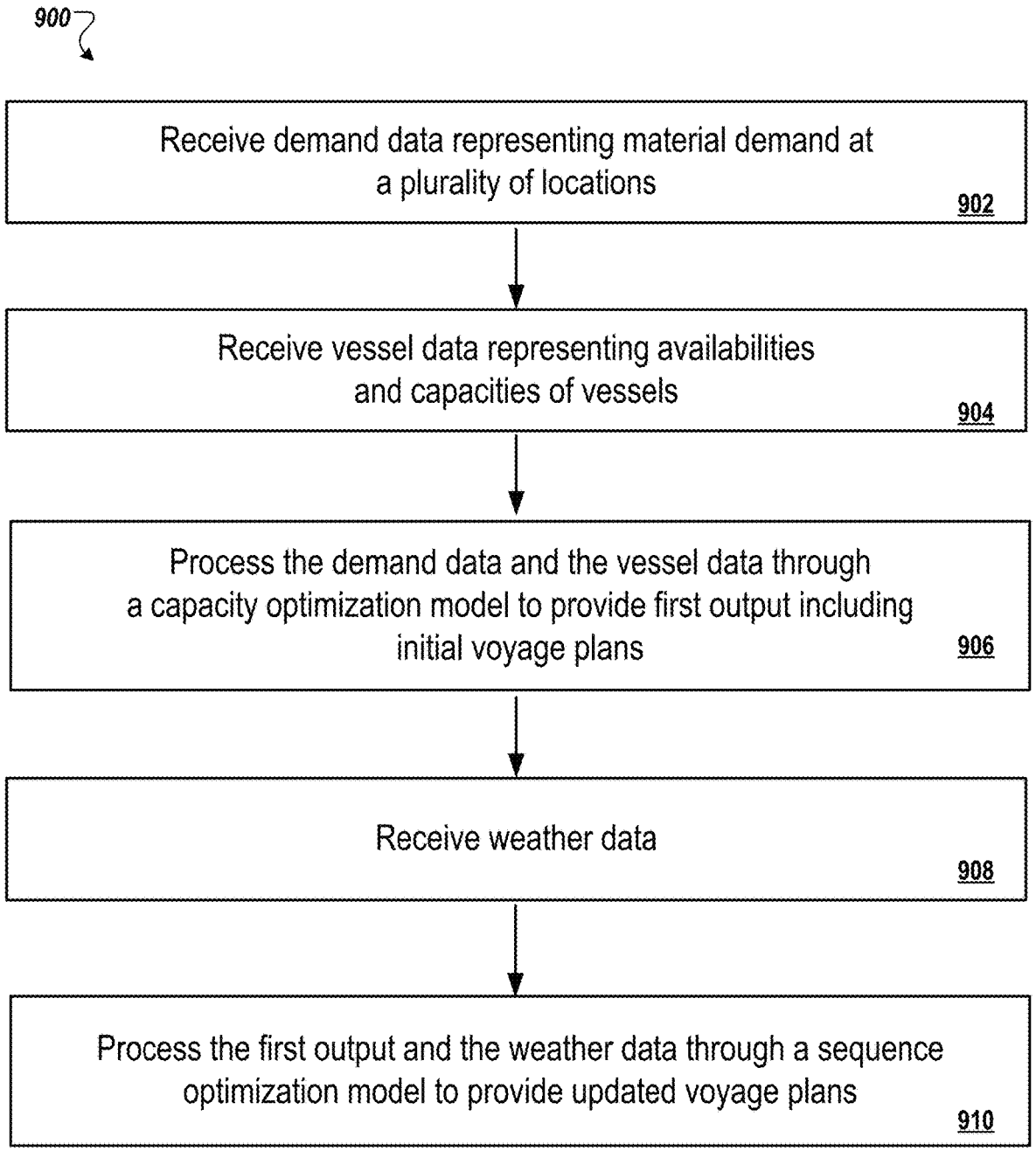
FIG. 9 is a flowchart of an example process that can be executed in accordance with implementations of the present disclosure.

FIG. 9 is a flowchart of an example process 900 that can be executed in accordance with implementations of the present disclosure. In some implementations, the example process 900 may be performed using one or more computer-executable programs executed using one or more computing devices.

Demand data representing material demand at a plurality of locations is received (902). For example, and as described herein, the capacity optimizer 130 can receive the demand data 110 indicating a type and amount of material demand, and a location of the demand.

Vessel data representing availabilities and capacities of vessels is received (904). For example, and as described herein, the vessel data 106 can include availabilities of each vessel in a fleet of vessels. The vessel data 106 can also include, for example, a capacity of the vessel for each of various material types, a size of the vessel, and a speed of the vessel.

The demand data and the vessel data are processed through a capacity optimization model to provide first output including initial voyage plans (906). For example, and as described herein, the demand data 110 and the vessel data 106 are processed through the capacity optimizer 130 to provide initial voyage plans 120.

Weather data is received (908). For example, and as described herein, the capacity optimizer 130 receives data indicating wave height, wind speed, and visibility.

The first output and the weather data are processed through a sequence optimization model to provide updated voyage plans (910). For example, and as described herein, the sequence optimizer 140 processes the initial voyage plans 120 and the weather data 142 to provide updated voyage plans 150. The updated voyage plans 150 can include a respective voyage plan for each vessel of the fleet of vessels.

Figure 10:
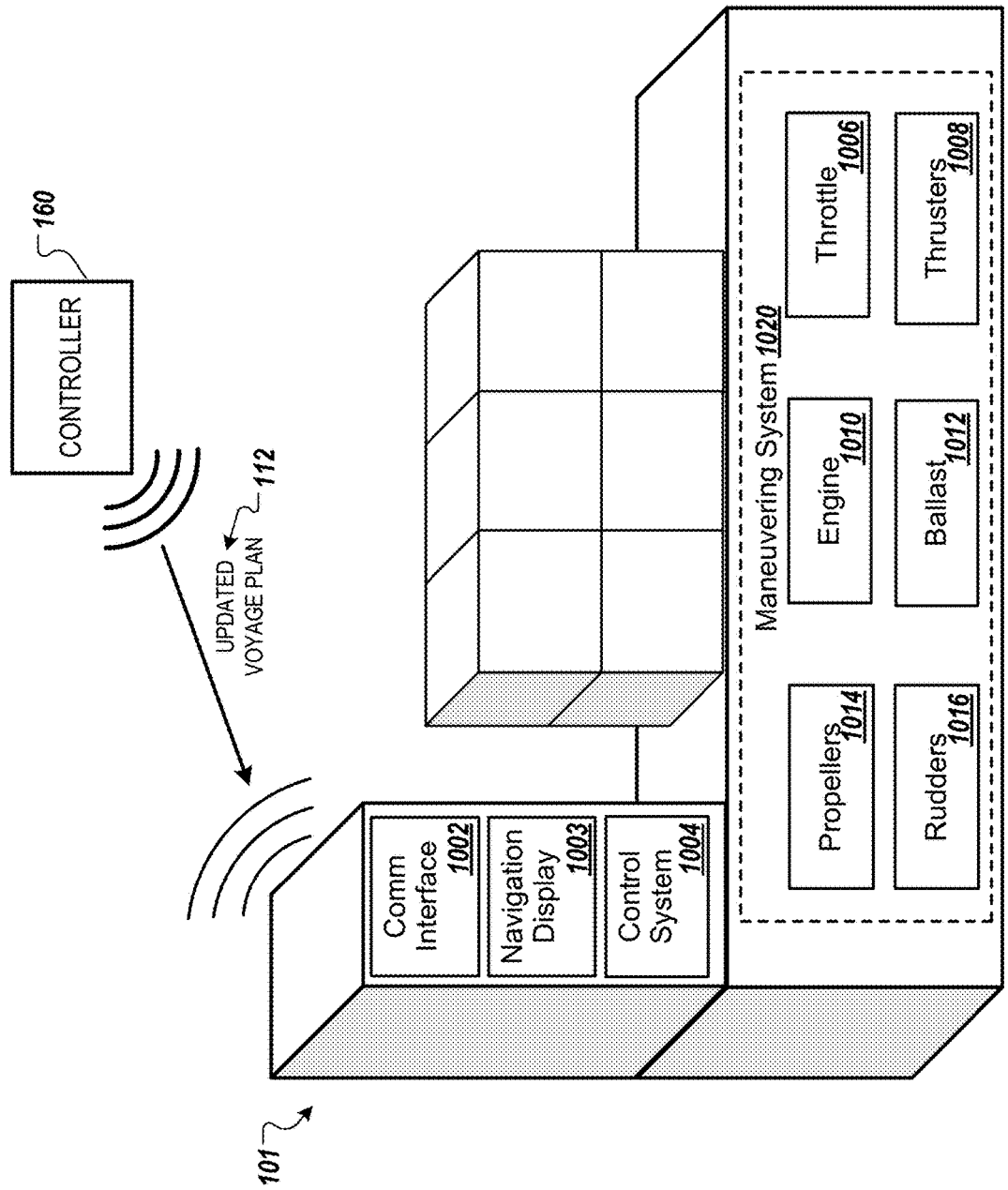
FIG. 10 depicts an example vessel in accordance with the present disclosure.

FIG. 10 depicts an example vessel 101 in accordance with the present disclosure. The vessel 101 can be configured for autonomous piloting. The vessel 101 receives an updated voyage plan 112 from the controller 160. The updated voyage plan 112 can be included in the set of updated voyage plans 150 provided by the sequence optimizer 140. In response to receiving the updated voyage plan 112 from the controller 160, the computing system, for example, a control system 1004, of the vessel 101 can adjust one or more settings of a maneuvering system 1020 of the vessel 101. Adjusting settings of the maneuvering system 1020 of the vessel 101 can include changing one or more of a speed of the marine vessel, a trim of the marine vessel, a draft of the marine vessel, and/or a direction of travel of the marine vessel.

In some examples, the controller 160 can generate a visualization of the updated voyage plan 112 for display through a user interface of a computing device, for example, a navigation display 1003. In some examples, the computing device can be a voyage planning computer in communication with the navigation display 1003 that is viewable by an operator of the vessel 101. In some examples, the device includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some examples, the control system 1004 can provide, through the user interface of the navigation display 1003, an indication of a suggested adjustment to the maneuvering system of the marine vessel. For example, the suggested adjustment to the maneuvering system 1020 based on the updated voyage plan 112 can be an increase of speed from thirteen knots to fourteen knots. In some examples, the control system 1004 can generate a notification for an operator of the vessel 101. In some cases, the notification can indicate that the maneuvering system 1020 has been adjusted or will be adjusted. In some cases, the notification can indicate a particular adjustment that has been made or will be made to the maneuvering system 1020. The control system 1004 presents the notification to an operator of the vessel 101 through the navigation display 1003.

In some examples, a time period can be provided, within which user input can be received to accept or reject the updated voyage plan 112 or portions thereof. For example, the time period can be upon issuance of the notification. If user input has not been received upon expiration of the time period, the updated voyage plan 112 is automatically adopted. For example, the control system 1004 can adjust one or more settings of the maneuvering system 1020 of the vessel 101, which can include, for example and without limitation, changing one or more of a speed of the marine vessel, a trim of the marine vessel, a draft of the marine vessel, and/or a direction of travel of the marine vessel.

In some examples, the controller 160 can receive, through the user interface of the navigation display 1003, user input indicating approval of the suggested adjustment to the maneuvering system 1020 of the marine vessel. For example, an operator of the vessel 101 can input, to the navigation display 1003, an indication of approval of the suggested adjustment of increasing vessel speed from thirteen knots to fourteen knots. In some examples, in response to receiving the user input indicating approval of the suggested adjustment, the control system 1004 can transmit, to the maneuvering system 1020, an instruction to adjust throttle settings to increase vessel speed from thirteen knots to fourteen knots.

In some examples, the operator of the marine vessel can opt to override the instruction. For example, the control system 1004 can display, through the user interface of navigation display 1003, a selectable option permitting the operator to reject the suggestion to increase the vessel speed. In response to receiving the user input indicating rejection of the suggestion, the control system 1004 can maintain the maneuvering system 1020 at current settings in order to maintain the vessel 101 at the current speed.

In some examples, the control system 1004 of the vessel 101 can store a log of adjustments that have been made to the maneuvering system 1020, a log of adjustments that have been suggested, a log of adjustments that have been approved, and/or a log of adjustments that have been rejected. In some examples, the operator of the vessel 101 can provide, through a user interface of the navigation display 1003, an indication of a reason for approval or a reason of rejection of the adjustment. The control system 1004 can store data indicating the approval or rejection as well as the reason for the approval or rejection.

In some examples, in response to receiving the updated voyage plan 112, the control system 1004 of the vessel 101 can generate a notification or alert for the operator of the vessel 101. The alert can include, for example, a visible or audible alert indicating that the voyage plan 112 has been received.

In some examples, the control system 1004 of the vessel 101 may generate an alert based on a difference between the initial voyage plan 111 and the updated voyage plan 112. For example, the updated voyage plan 112 may require a change to a current setting of the maneuvering system of the vessel. The control system 1004 of the marine vessel may generate the alert based on the updated voyage plan 112 requiring a change to current setting of the maneuvering system In some examples, the control system 1004 of the vessel 101 may provide, on the navigation display 1003, a visualization of the updated voyage plan 112. The visualization can include a plot of the updated voyage plan 112 on a map or nautical chart. In some examples, the visualization can show a difference between the initial voyage plan 111 and the updated voyage plan 112. For example, the visualization can show waypoints and routes of the updated voyage plan 112 overlaid on the waypoints and routes of the initial voyage plan 111. The visualization can be annotated with information on each leg of the voyage. For example, each waypoint and/or each leg of the voyage between sequential waypoints can be annotated with data associated with the updated voyage plan 112 for that waypoint or voyage leg. The annotations can indicate, for example, a speed, a course, and/or a time.

The controller 160 can provide an updated voyage plan 112 periodically and/or at intervals. For example, the controller 160 can provide an updated voyage plan 112 at intervals of one minute, five minutes, six minutes, ten minutes, etc. In some examples, the controller 160 can provide an updated voyage plan 112 upon request. For example, an operator of the vessel 101 may input a request for an updated voyage plan 112, for example, to the control system 1004 through the navigation display 1003. In response to the request, the control system 1004 can communicate the request to the controller 160 through the communications interface 1002. In response to receiving the request, the controller 160 can generate an updated voyage plan 112.

In some examples, the controller 160 can communicate the updated voyage plan 112 as a set of navigation instructions. The set of navigation instructions can include turn-by-turn instructions. The control system 1004 can then control the maneuvering system 1020 such that the vessel 101 navigates according to the turn-by-turn instructions. When the vessel 101 receives a new updated voyage plan including a new set of turn-by-turn instructions, the control system 1004 can change settings of the maneuvering system to follow the new set of turn-by-turn instructions.

In some examples, the updated voyage plan 112 can include a specified speed of the marine vessel at each leg of the voyage. The control system 1004 can translate the specified speed to settings of the vessel 101. For example, based on the specified speed, the control system 1004 can determine appropriate settings for the throttle 1006, engine 1010, ballast 1012, thrusters 1008, etc.

The control system 1004 and the maneuvering system 1020 can be communicably connected to a cognitive computing interface. The interface can be configured to transmit data to and receive data from each of the control system 1004 and the maneuvering system in order to facilitate communication between the control system 1004 and the maneuvering system 1020.

As the vessel 101 transits through water, a control system 1004 of the vessel 101 can control the maneuvering system 1020 of the vessel 101. The maneuvering system 1020 of the vessel 101 can include engine 1010, propellers 1014, air tanks, turbines, ballast tanks 1012, etc. The maneuvering system 1020 of the vessel 101 can control the direction of travel of the vessel 101, the depth of the vessel 101, etc. For example, the maneuvering system 1020 can be controlled to navigate the vessel 101 around obstacles, to submerge and surface the vessel 101, to change physical configurations of the vessel 101, etc.

In some examples, the control system 1004 can receive navigation instructions from the controller 160. In some examples, the control system 1004 can generate navigation instructions based on input from the controller 160. For example, as part of the updated voyage plan 112, the controller 160 can transmit a destination location to the control system 1004. The control system 1004 can then control the maneuvering system 1020 of the vessel 101 to navigate the vessel 101 according to the navigation instructions.

Upon receiving the updated voyage plan 112, the control system 1004 can determine, based on the updated voyage plan, an updated setting of the maneuvering system 1020. The control system 1004 can adjust the setting of the maneuvering system 1020 to the updated setting of the maneuvering system 1020. Adjusting the setting can include, for example, generating control signals for the maneuvering system 1020 to adjust settings of the engine 1010 to change a speed of the vessel 101.

In some examples, the control system 1004 can present the settings to the navigation display 1003 (e.g., for review by the operator of the vessel 101). The operator can review, approve, or reject the adjusted settings. In response to approval of the adjusted settings, the control system 1004 can send instructions to the maneuvering system 1020 to adjust the settings as specified in the updated voyage plan 112.

In some examples, the control system 1004 may determine that the updated voyage plan 112 does not require an adjustment to any settings of the maneuvering system 1020. In these examples, the control system 1004 can determine not to send instructions to the maneuvering system based on the updated voyage plan 112. In some examples, the control system 1004 may determine that the updated voyage plan 112 does not require an immediate adjustment to any settings of the maneuvering system 1020, but will require a future adjustment to a setting of the maneuvering system 1020. For example, the control system 1004 may determine that the updated voyage plan 112 requires an adjustment to slow a speed of the engine 1010 at a future time or location. In these examples, the control system 1004 can schedule an instruction to be sent to the maneuvering system 1020 to adjust the setting of the maneuvering system 1020 at the appropriate time or location. At the scheduled time, the control system 1004 can send, to the maneuvering system 1020, an instruction to adjust the setting of the maneuvering system 1020.

In some examples, the maneuvering system 1020 includes a controller that controls all components of the maneuvering system 1020. In some examples, the maneuvering system 1020 can include a separate controller that receives instructions from the control system 1004 and determines a control signal that controls the components of the maneuvering system 1020. In some examples, the cognitive computing interface receives the one or more instructions determined by the control system 1004 and determines a control signal for the controller of the maneuvering system 1020.

For example, the maneuvering system 1020 can include a central controller that transmits control signals to each of the engine 1010, the propellers 1014, the air tank, throttle 1006, thrusters 1008, rudders 1016, and the ballast tanks 1012. In some examples, the maneuvering system 1020 includes a controller for each component of the maneuvering system 1020. For example, the maneuvering system 1020 can include a separate controller that transmits control signals to each of engine 1010, the propellers 1014, the air tanks, the throttle 1006, the thrusters 1008, the rudders 1016, and the ballast tanks 1012.

The speed of the vessel 101 can be adjusted, for example, using the propellers 1014, the engine 1010, the throttle 1006, and the ballast tanks 1012. For example, to increase speed of the vessel 101, the control system 1004 can send an instruction to the maneuvering system 1020 that causes one or more engines 1010 to start up or speed up, that causes one or more throttles 1006 to open to a higher setting, that causes one or more propellers 1014 to change to a greater pitch, and/or that causes one or more ballast tanks 1012 to deballast. To decrease speed of the vessel 101, the control system 1004 can send an instruction to the maneuvering system 1020 that causes one or more engines 1010 to shut down or slow down, that causes one or more throttles 1006 to shut to a lower setting, that causes one or more propellers 1014 to change to a lesser pitch, and/or that causes one or more ballast tanks 1012 to ballast.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method executed by one or more processors and comprising:
   receiving, by at least one processor, demand data representing types of material and quantities of the material demanded for each of a plurality of locations within a geographical area;
   receiving, by the at least one processor, vessel data representing availabilities and capacities of each of a plurality of vessels;
   processing, by the at least one processor, the demand data and the vessel data through a capacity optimization model to provide a first output comprising initial voyage plans for the plurality of vessels;

receiving, by the at least one processor, weather data representing predicted weather conditions within the geographical area;

processing, by the at least one processor, the first output and the weather data through a sequence optimization model to provide a second output, wherein the second output comprising updated voyage plans for the plurality of vessels, wherein each of the initial voyage plans and each of the updated voyage plans defines a type of the material, a quantity of the material, a vessel of the plurality of vessels, and a sequence of locations in the plurality of locations, wherein processing the first output and the weather data through the sequence optimization model comprises executing a genetic algorithm for optimizing the initial voyage plans, and wherein executing the genetic algorithm for optimizing the initial voyage plans comprises:

generating vector representations of variables including the sequence of locations, a speed of travel between locations of the sequence of locations, a waiting time at each of the sequence of locations for each of the plurality of vessels;

performing multiple custom mutations of the variables in each generation of a plurality of generations associated with the genetic algorithm;

iteratively optimizing the variables for each of the plurality of vessels, based on the multiple custom mutations; and outputting an optimal solution based on the iterative optimization of the variables, wherein the optimal solution comprises a change in an engine speed of at least one vessel of the plurality of vessels moving between two locations of the sequence of locations, based on a duration of the waiting time at least one location of the sequence of locations; and based on the updated voyage plans, transmitting, to computing systems of the plurality of vessels, instructions that cause the computing systems to adjust one or more settings of respective maneuvering systems of the plurality of vessels to voyage under the updated voyage plans, wherein the adjusted one or more settings comprises the change in the engine speed of the at least one vessel.

2. The method of claim 1, wherein the demand data comprises a plurality of demand elements, each demand element indicating a type of the material, a quantity of the material, and a location of the plurality of locations, and wherein the location comprises a destination location or an originating location of the material.

3. The method of claim 2, wherein processing the demand data and the vessel data through a capacity optimization model to provide the first output comprises:

generating, for each demand element, a preliminary voyage from a hub to the location indicated by the demand element, wherein the hub comprises an originating location of the plurality of vessels; and iteratively performing voyage merges by:

selecting, from preliminary voyages, a pair of voyages;

determining that the pair of voyages satisfies criteria for merging; and merging the pair of voyages into a combined voyage.

4. The method of claim 3, comprising, for each iteration of performing voyage merges:

generating, from the vessel data, a mock vessel; and assigning the mock vessel to each preliminary voyage.

5. The method of claim 3, comprising:

after merging the pairs of voyages, assigning the combined voyage to a vessel of the plurality of vessels based on the availabilities and capacities of the plurality of vessels.

6. The method of claim 3, wherein merging the pair of voyages comprises:

joining a first demand element of a first voyage to a second demand element of a second voyage.

7. The method of claim 6, wherein:

each preliminary voyage comprises a sequence that begins and ends at the hub;

the sequence includes a starting demand element that immediately follows the hub in the sequence; and the sequence includes an ending demand element that immediately precedes the hub in the sequence.

8. The method of claim 7, wherein determining that the pair of voyages satisfies criteria for merging comprises determining that the first demand element and the second demand element are each either a starting demand element or an ending demand element.

9. The method of claim 1, wherein each of the plurality of vessels comprises an ocean-going vessel.

10. The method of claim 1, wherein the weather data comprises data indicating at least one of visibility, wave height, and wind speed.

11. A non-transitory computer-readable storage medium coupled to one or more processors and having instructions stored thereon which, when executed by the one or more processors, cause the one or more processors to perform operations comprising:

receiving demand data representing types of material and quantities of the material demanded for each of a plurality of locations within a geographical area;

receiving vessel data representing availabilities and capacities of each of a plurality of vessels;

processing the demand data and the vessel data through a capacity optimization model to provide a first output comprising initial voyage plans for the plurality of vessels;

receiving weather data representing predicted weather conditions within the geographical area;

processing the first output and the weather data through a sequence optimization model to provide a second output, wherein the second output comprising updated voyage plans for the plurality of vessels, wherein each of the initial voyage plans and each of the updated voyage plans defines a type of the material, a quantity of the material, a vessel of the plurality of vessels, and a sequence of locations, wherein processing the first output and the weather data through the sequence optimization model comprises executing a genetic algorithm for optimizing the initial voyage plans, and wherein executing the genetic algorithm for optimizing the initial voyage plans comprises:

generating vector representations of variables including the sequence of locations, a speed of travel between locations of the sequence of locations, a waiting time at each of the sequence of locations for each of the plurality of vessels;

performing multiple custom mutations of the variables in each generation of a plurality of generations associated with the genetic algorithm;

iteratively optimizing the variables for each of the plurality of vessels, based on the multiple custom mutations; and outputting an optimal solution based on the iterative optimization of the variables, wherein the optimal solution comprises a change in an engine speed of at least one vessel of the plurality of vessels moving between two locations of the sequence of locations, based on a duration of the waiting time at at least one location of the sequence of locations; and based on the updated voyage plans, transmitting, to computing systems of the plurality of vessels, instructions that cause the computing systems to adjust one or more settings of respective maneuvering systems of the plurality of vessels to voyage under the updated voyage plans, wherein the adjusted one or more settings comprises the change in the engine speed of the at least one vessel.

12. The non-transitory computer-readable storage medium of claim 11, wherein the demand data comprises a plurality of demand elements, each demand element indicating a type of the material, a quantity of the material, and a location of the plurality of locations, and wherein the location comprises a destination location or an originating location of the material.

13. The non-transitory computer-readable storage medium of claim 12, wherein processing the demand data and the vessel data through a capacity optimization model to provide the first output comprises:

generating, for each demand element, a preliminary voyage from a hub to the location indicated by the demand element, wherein the hub comprises an originating location of the plurality of vessels; and iteratively performing voyage merges by:
generating, from the vessel data, a mock vessel;
assigning the mock vessel to each preliminary voyage;
selecting, from the preliminary voyages, a pair of voyages;
determining that the pair of voyages satisfies criteria for merging; and
merging the pair of voyages into a combined voyage.

14. The non-transitory computer-readable storage medium of claim 13, the operations comprising:

after merging the pairs of voyages, assigning the combined voyage to a vessel of the plurality of vessels based on the availabilities and capacities of the plurality of vessels.

15. The non-transitory computer-readable storage medium of claim 13, wherein merging the pair of voyages comprises:

joining a first demand element of a first voyage to a second demand element of a second voyage.

16. The non-transitory computer-readable storage medium of claim 15, wherein: each preliminary voyage comprises a sequence that begins and ends at the hub;

the sequence includes a starting demand element that immediately follows the hub in the sequence; and the sequence includes an ending demand element that immediately precedes the hub in the sequence, wherein determining that the pair of voyages satisfies criteria for merging comprises determining that the first demand element and the second demand element are each either a starting demand element or an ending demand element.

17. The non-transitory computer-readable storage medium of claim 11, wherein:

each of the plurality of vessels comprises an ocean-going vessel, and the weather data comprises data indicating at least one of visibility, wave height, and wind speed.

18. A system, comprising:

a computing device comprising at least one processor; and a computer-readable storage device coupled to the computing device and having instructions stored thereon which, when executed by the computing device, cause the computing device to perform operations comprising:

receiving, by the at least one processor, demand data representing types of material and quantities of the material demanded for each of a plurality of locations within a geographical area;

receiving, by the at least one processor, vessel data representing availabilities and capacities of each of a plurality of vessels;

processing, by the at least one processor, the demand data and the vessel data through a capacity optimization model to provide a first output comprising initial voyage plans for the plurality of vessels;

receiving, by the at least one processor, weather data representing predicted weather conditions within the geographical area;

processing, by the at least one processor, the first output and the weather data through a sequence optimization model to provide a second output, wherein the second output comprising updated voyage plans for the plurality of vessels, wherein each of the initial voyage plans and each of the updated voyage plans defines a type of the material, a quantity of the material, a vessel of the plurality of vessels, and a sequence of locations, wherein processing the first output and the weather data through the sequence optimization model comprises executing a genetic algorithm for optimizing the initial voyage plans, and wherein executing the genetic algorithm for optimizing the initial voyage plans comprises:

generating vector representations of variables including the sequence of locations, a speed of travel between the sequence of locations, a waiting time at each of the sequence of locations for each of the plurality of vessels;

performing multiple custom mutations of the variables in each generation of a plurality of generations associated with the genetic algorithm;

iteratively optimizing the variables for each of the plurality of vessels, based on the multiple custom mutations; and outputting an optimal solution based on the iterative optimization of the variables, wherein the optimal solution comprises a change in an engine speed of at least one vessel of the plurality of vessels moving between two locations of the sequence of locations, based on a duration of the waiting time at at least one location of the sequence of locations; and based on the updated voyage plans, transmitting, to computing systems of the plurality of vessels, instructions that cause the computing systems to adjust one or more settings of respective maneuvering systems of the plurality of vessels to voyage under the updated voyage plans, wherein the adjusted one or more settings comprises the change in the engine speed of the at least one vessel.

* * * * *